US007742597B2

(12) United States Patent
Lewis

(10) Patent No.: US 7,742,597 B2
(45) Date of Patent: Jun. 22, 2010

(54) EXCLUSIVE ENCRYPTION SYSTEM

(76) Inventor: James M. Lewis, 11405 Alabama Highway 33, Moulton, AL (US) 35650

( * ) Notice: Subject to any disclaimer, the term of this patent is extended or adjusted under 35 U.S.C. 154(b) by 236 days.

(21) Appl. No.: 12/003,557

(22) Filed: Dec. 28, 2007

(65) Prior Publication Data

US 2009/0129585 A1 May 21, 2009

(51) Int. Cl.
*H04L 9/00* (2006.01)
*H04L 9/32* (2006.01)
*G06F 11/30* (2006.01)
(52) U.S. Cl. .......................... 380/28; 380/37; 713/189; 713/190; 713/191; 713/192; 713/193
(58) Field of Classification Search .................... 380/28
See application file for complete search history.

(56) References Cited

U.S. PATENT DOCUMENTS

| 5,321,748 | A | * | 6/1994 | Zeidler et al. ................ 380/214 |
| 6,823,069 | B1 | * | 11/2004 | Kitajima et al. ................ 380/44 |
| 2001/0038693 | A1 | * | 11/2001 | Luyster ........................ 380/37 |
| 2003/0152221 | A1 | * | 8/2003 | Cheng et al. ................... 380/46 |
| 2004/0212708 | A1 | * | 10/2004 | Spartiotis et al. ............. 348/295 |
| 2007/0244951 | A1 | * | 10/2007 | Gressel et al. ............... 708/252 |

FOREIGN PATENT DOCUMENTS

EP 0359 729 A2 * 3/1990

OTHER PUBLICATIONS

FIPS Publication 197 "Announcing the Advanced Encryption Standard (AES)"—Nov. 26, 2001.*
Online pub; imc.org; Mar. 11, 1999; P. Guttman, M. Nystrom; "More on KEKIdentifiers . . . CMS".
Print pub; Nov. 26, 2001; "Processing Standards Publication 197".

* cited by examiner

*Primary Examiner*—Longbit Chai
(74) *Attorney, Agent, or Firm*—Welsh & Flaxman LLC

(57) ABSTRACT

An encryption system includes a plurality of encryption operations including individual encryption operations and group encryption operations available for application in the encryption of data. The plurality of encryption operations are selected from the group consisting of functional variance, functional alignment, mathematical offset, wide XOR function, short logical rotation, long logical rotation, functional order, and address encryption. The system includes at least one round of encryption composed of a first encryption operation and a second encryption operation. The first encryption operation is selected from the plurality of encryption operations acting upon input data to generate a first encrypted data set. The second encryption operation is selected from the plurality of encryption operations acting upon the first encrypted data set to generate a second encrypted data set. The first encryption operation and the second encryption operation are different.

22 Claims, 14 Drawing Sheets

Example Encryption Round

Figure 2, Example Encryption Round

Figure 3
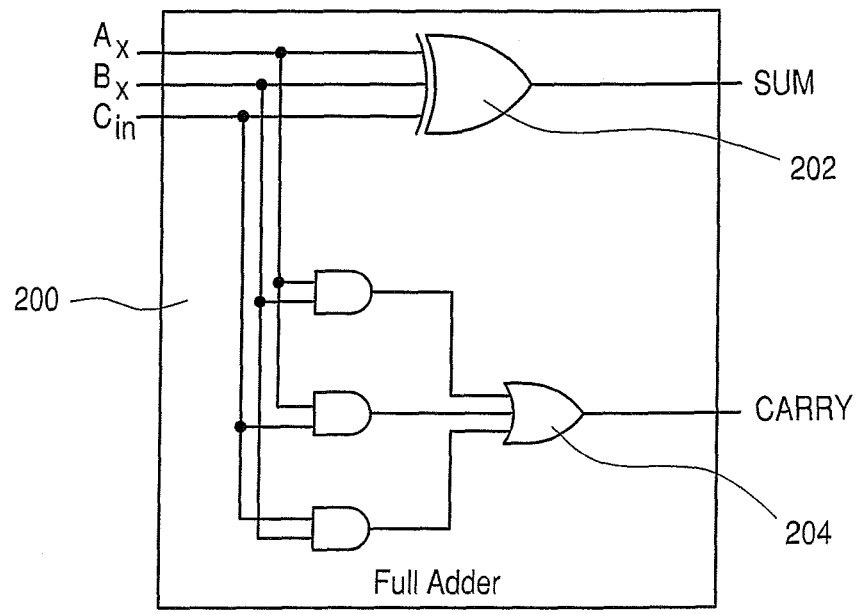
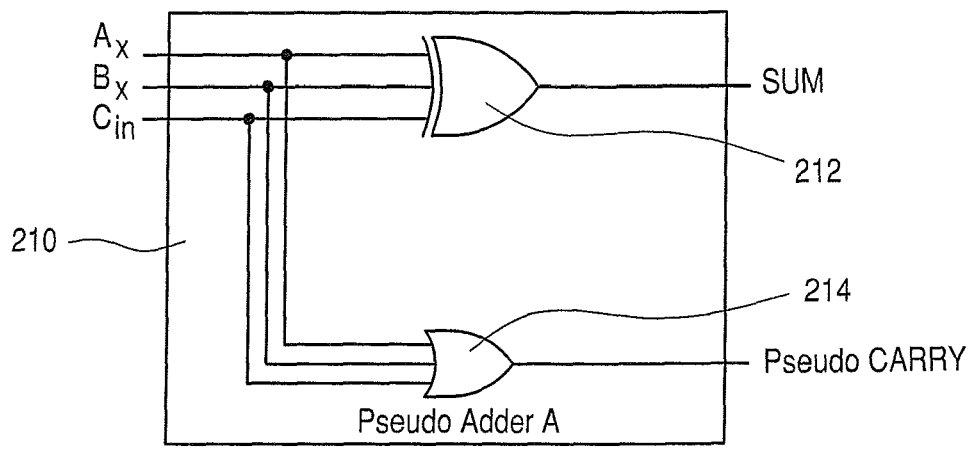
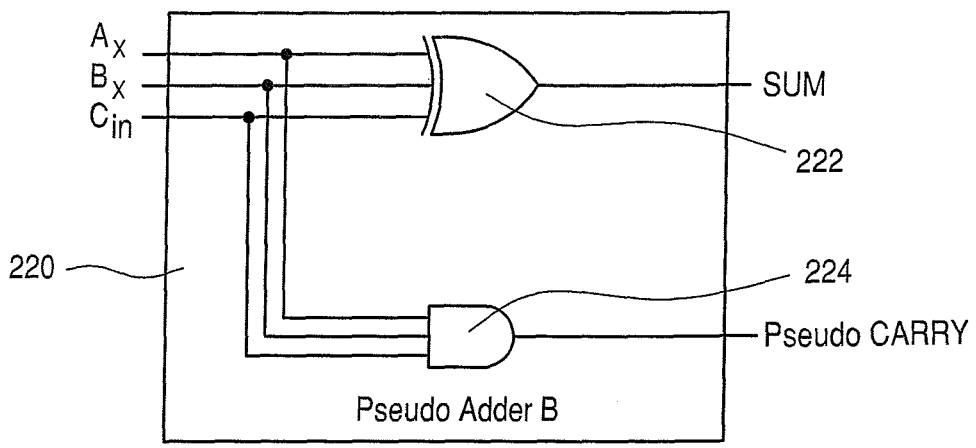

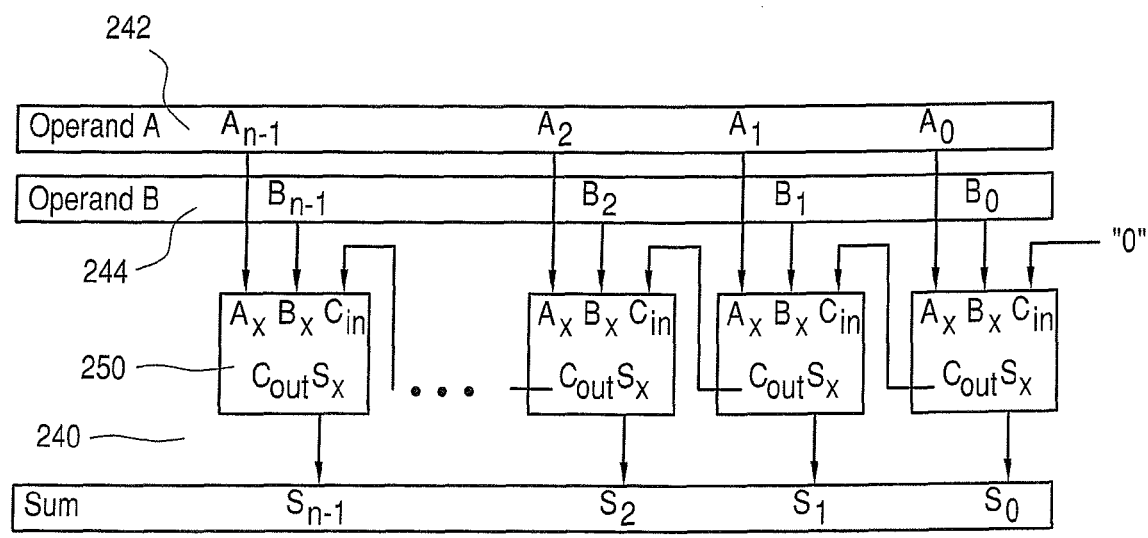
Figure 4. Adder elements combined into an n-bit Adder

| Key | Input | Adder Output | Pseudo A (OR Carry) Output | Pseudo B (AND Carry) Output | Pseudo C (AND/OR Carry) Output |
|---|---|---|---|---|---|
| 7 | 0 | 7 | 9 | 7 | 7 |
| 7 | 1 | 8 | 8 | 6 | 8 |
| 7 | 2 | 9 | 11 | 5 | 9 |
| 7 | 3 | 10 | 10 | 4 | 10 |
| 7 | 4 | 11 | 13 | 3 | 11 |
| 7 | 5 | 12 | 12 | 2 | 12 |
| 7 | 6 | 13 | 15 | 1 | 13 |
| 7 | 7 | 14 | 14 | 0 | 14 |
| 7 | 8 | 15 | 1 | 15 | 15 |
| 7 | 9 | 0 | 0 | 14 | 0 |
| 7 | 10 | 1 | 3 | 13 | 1 |
| 7 | 11 | 2 | 2 | 12 | 2 |
| 7 | 12 | 3 | 5 | 11 | 3 |
| 7 | 13 | 4 | 4 | 10 | 4 |
| 7 | 14 | 5 | 7 | 9 | 5 |
| 7 | 15 | 6 | 6 | 8 | 6 |
| 1 | 0 | 1 | 15 | 1 | 1 |
| 1 | 1 | 2 | 14 | 0 | 14 |
| 1 | 2 | 3 | 13 | 3 | 3 |
| 1 | 3 | 4 | 12 | 2 | 12 |
| 1 | 4 | 5 | 11 | 5 | 5 |
| 1 | 5 | 6 | 10 | 4 | 10 |
| 1 | 6 | 7 | 9 | 7 | 7 |
| 1 | 7 | 8 | 8 | 6 | 8 |
| 1 | 8 | 9 | 7 | 9 | 9 |
| 1 | 9 | 10 | 6 | 8 | 6 |
| 1 | 10 | 11 | 5 | 11 | 11 |
| 1 | 11 | 12 | 4 | 10 | 4 |
| 1 | 12 | 13 | 3 | 13 | 13 |
| 1 | 13 | 14 | 2 | 12 | 2 |
| 1 | 14 | 15 | 1 | 15 | 15 |
| 1 | 15 | 0 | 0 | 14 | 0 |

Figure 5, 4-bit Adder and Pseudo Adder example outputs

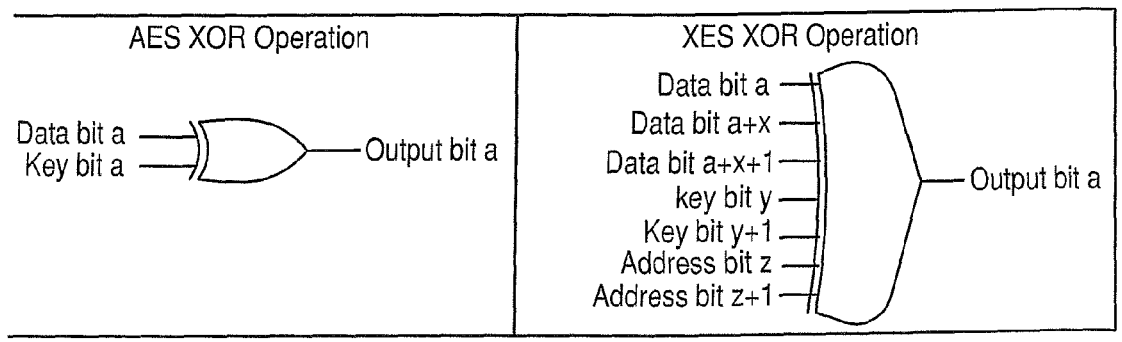
Figure 6, Comparison of Aes 2-input XOR to XES Wide XOR

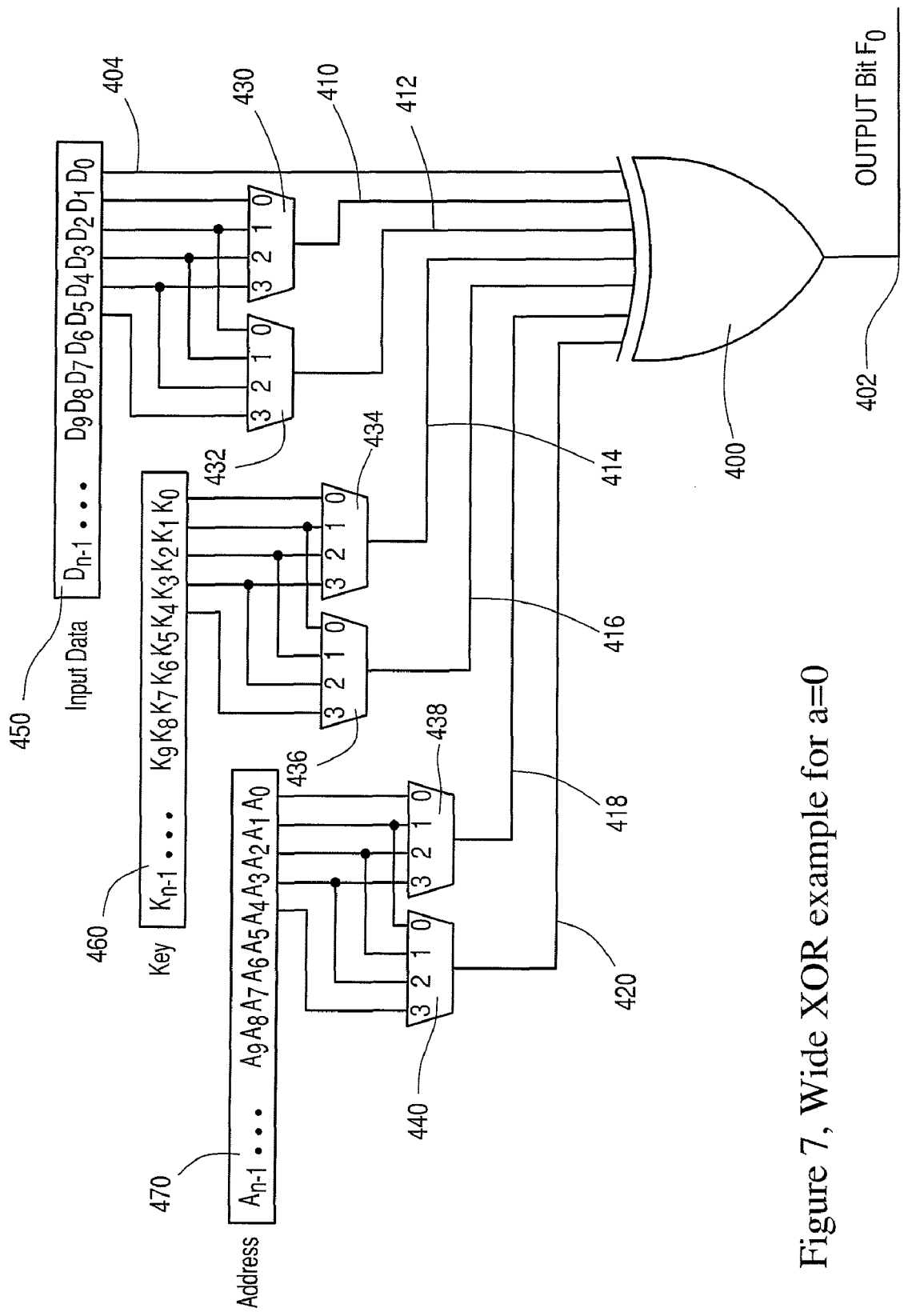
Figure 7, Wide XOR example for a=0

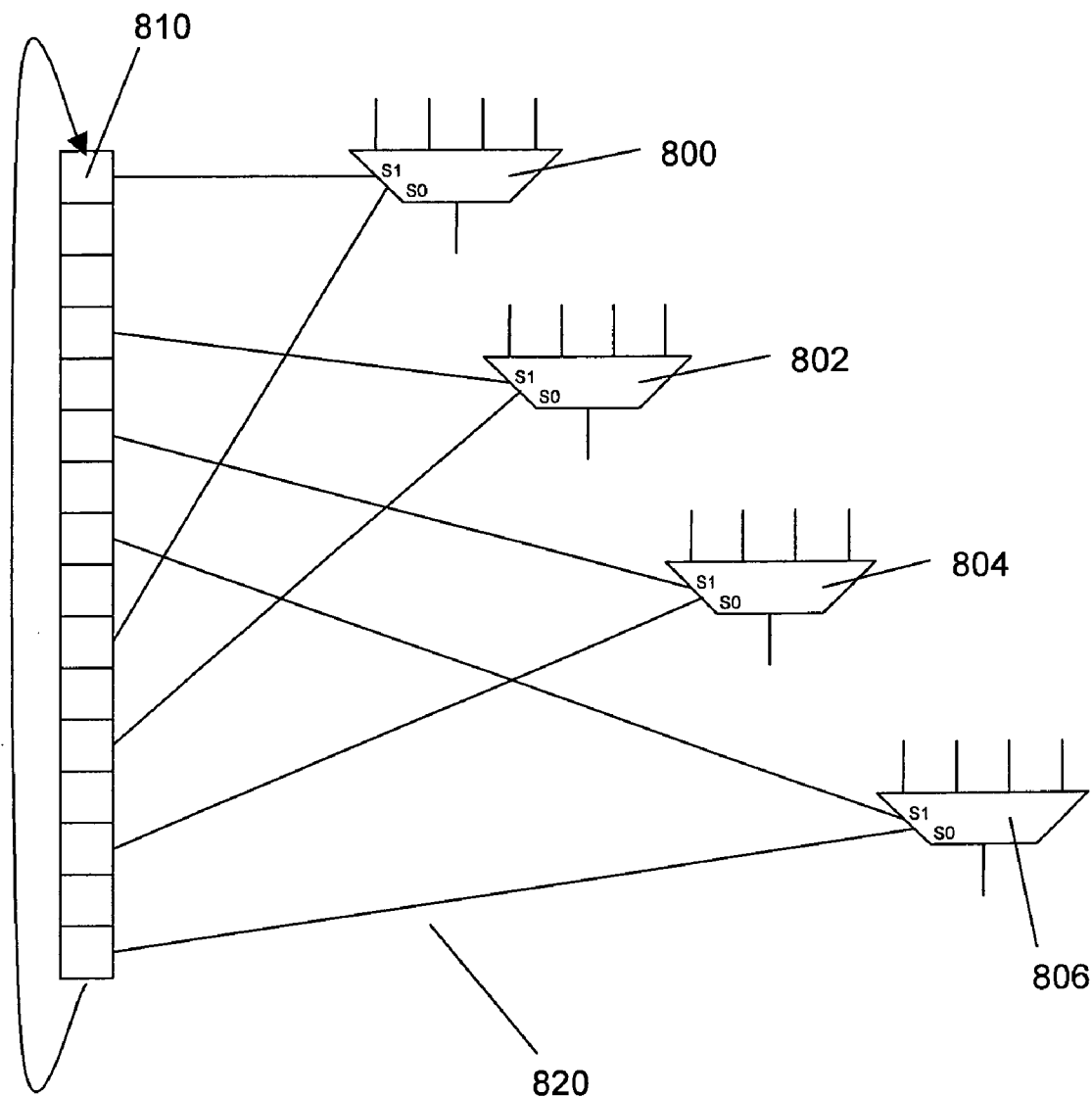
Figure 8, 16-bit circular buffer with outputs to multiplexer select line.

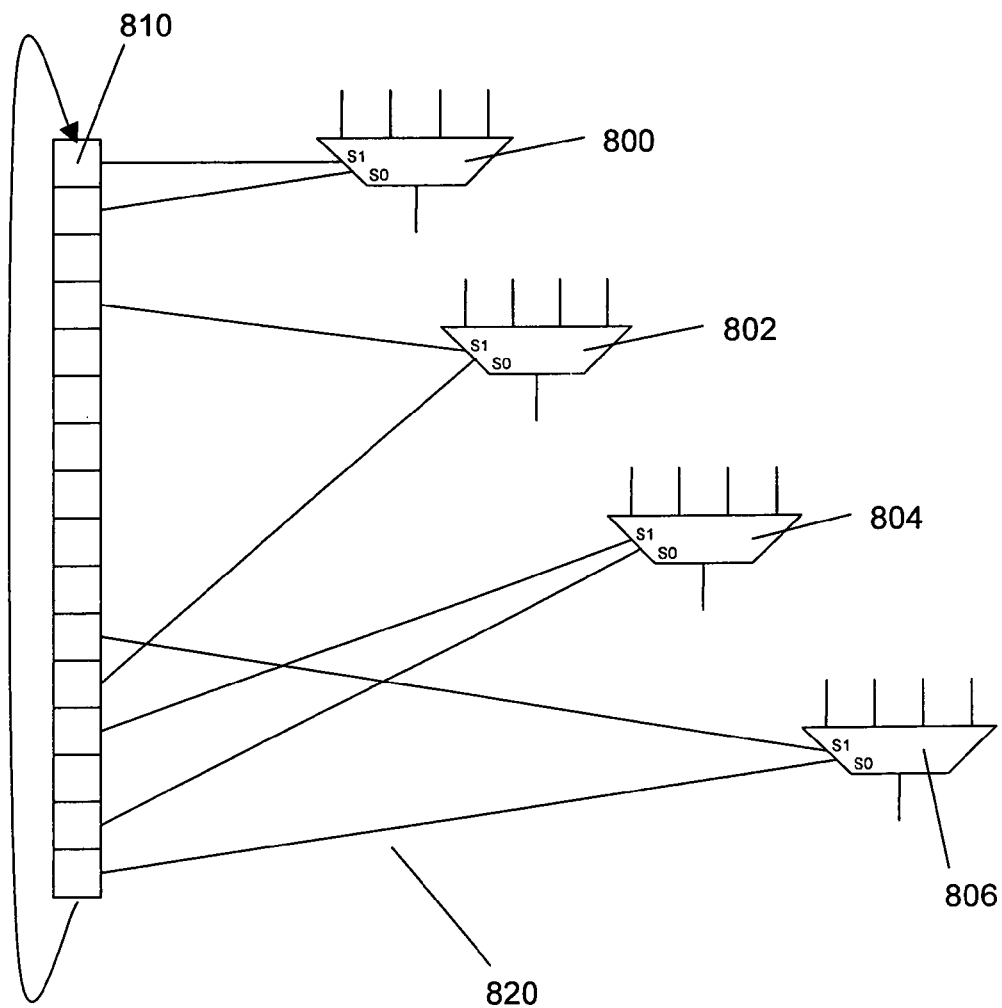
Figure 9, 16-bit circular buffer controlling multiplexers with irregular arrangement of select lines.

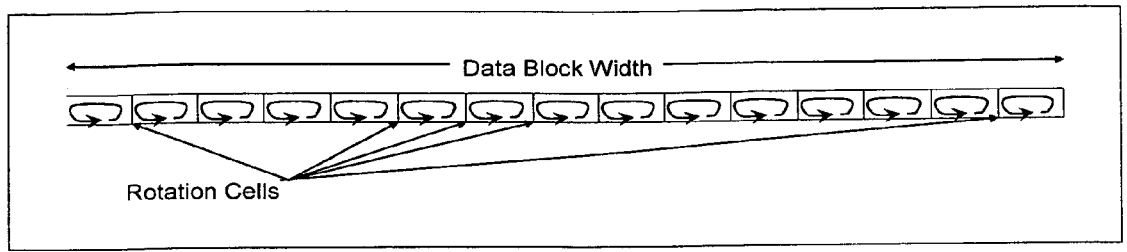
Figure 10, Cellular or Local Rotation

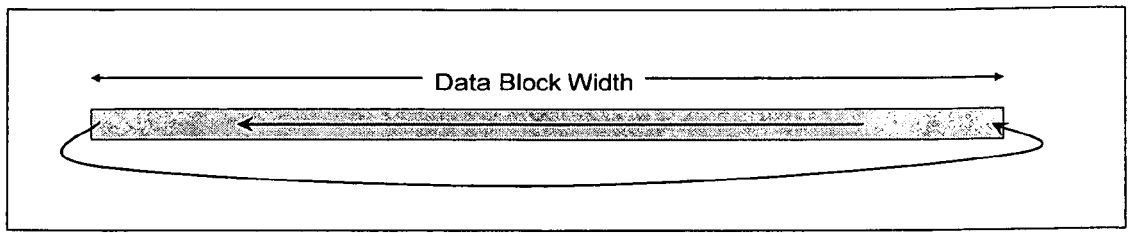
Figure 11, Block-wide or Global Rotation

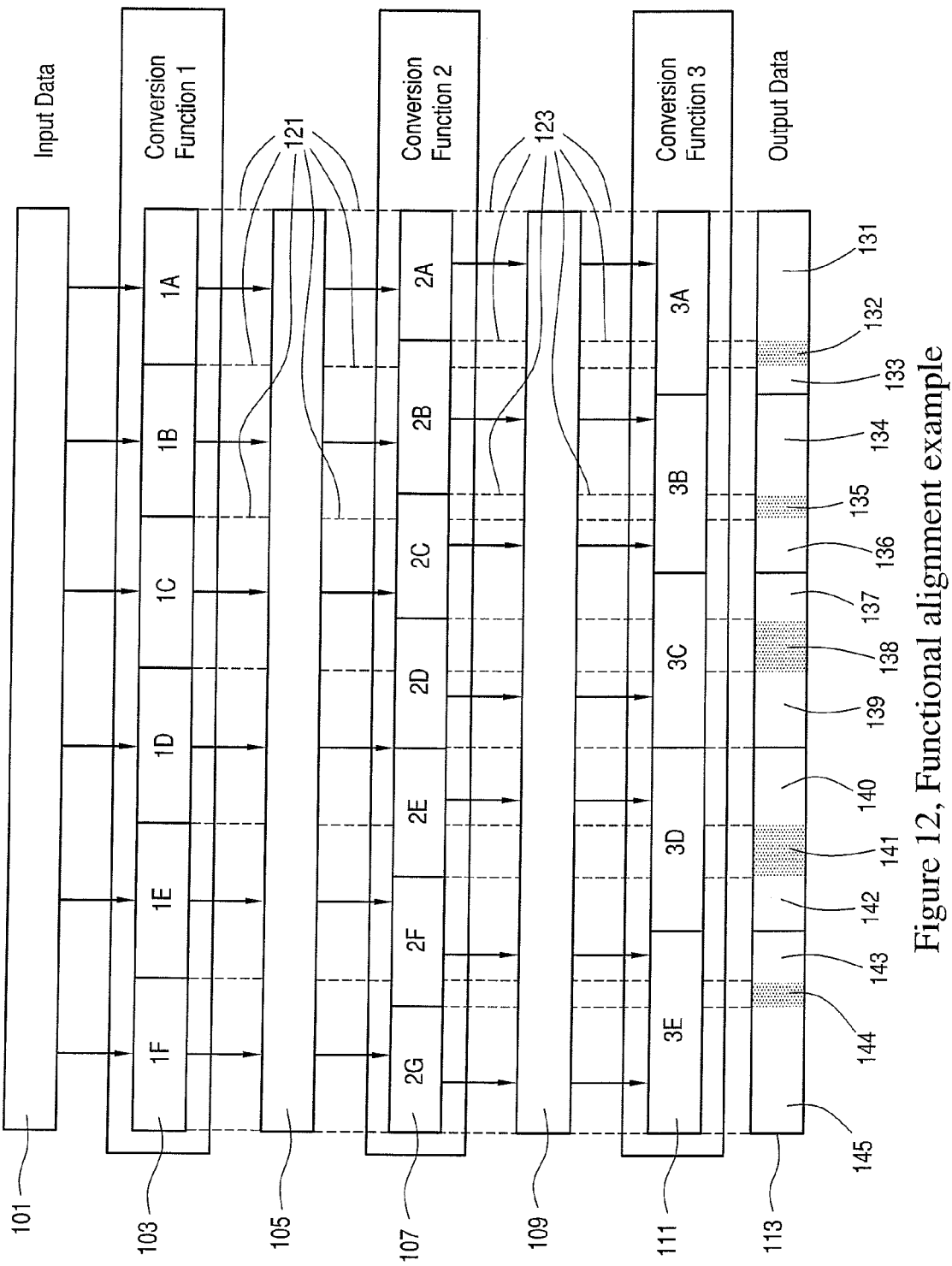
Figure 12, Functional alignment example

| Output Sub-Data Group | Operating Sub-Functions |
|---|---|
| 131 | 1A, 2A, 3A |
| 132 | 1A, 2B, 3A |
| 133 | 1B, 2B, 3A |
| 134 | 1B, 2B, 3B |
| 135 | 1B, 2C, 3B |
| 136 | 1C, 2C, 3B |
| 137 | 1C, 2C, 3C |
| 138 | 1C, 2D, 3C |
| 139 | 1D, 2D, 3C |
| 140 | 1D, 2E, 3D |
| 141 | 1E, 2E, 3D |
| 142 | 1E, 2F, 3D |
| 143 | 1E, 2F, 3E |
| 144 | 1F, 2F, 3E |
| 145 | 1F, 2G, 3E |

Figure 13, Output Data Functional Dependencies

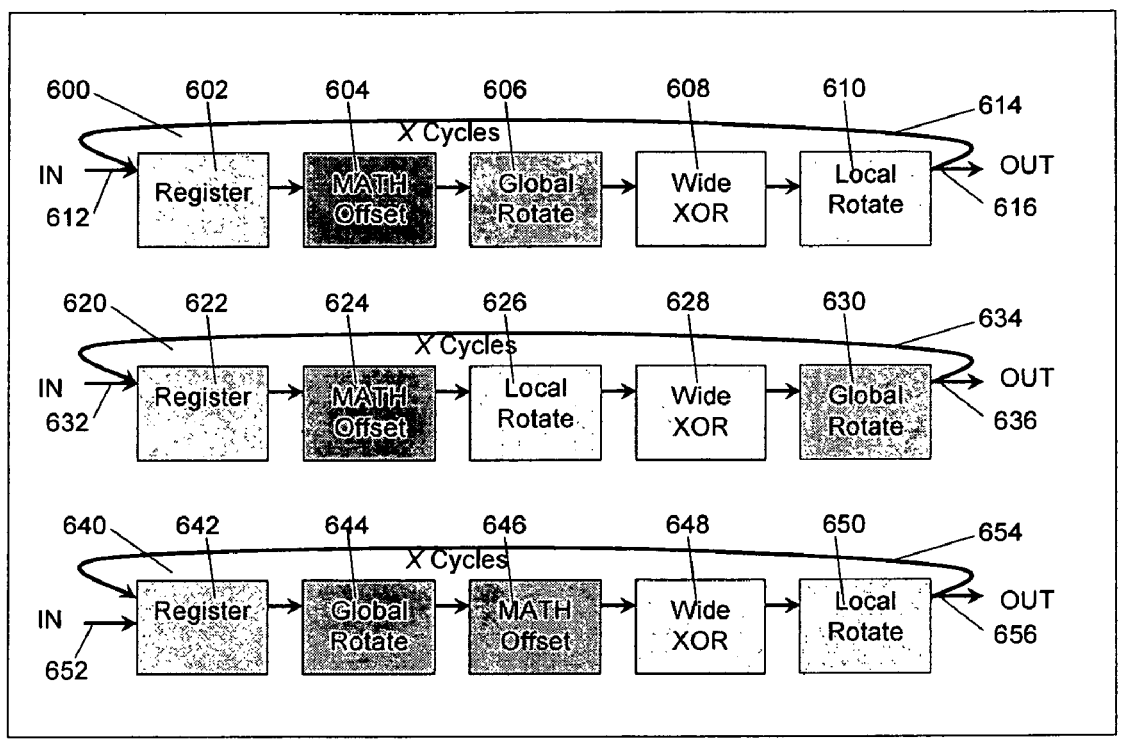
Figure 14, Variance in Functional Order

EXCLUSIVE ENCRYPTION SYSTEM

The U.S. Government has a paid-up license in this invention and the right in limited circumstances to require the patent owner to license others on reasonable terms as provided by the terms of contract number W31 P4Q-06-C-0372 awarded by the Department of Defense.

BACKGROUND OF THE INVENTION

1. Field of the Invention

The present invention relates to an encryption system. More particularly, the invention relates to an exclusive encryption system employing a unique encryption algorithm for each implementation.

2. Description of the Related Art

Various methods for encrypting digital data exist. Some of those are well known, as in the case of the DES Digital Encryption Standard) and AES (Advanced Encryption Standard). Both of these standards depend on the security of the key and the complexity and thoroughness of the encryption system to preclude any statistical attacks. Further, in modern cryptography, as it applies to digital data, the accepted practice is to use encryption systems that operate on large block sizes (such as 128-bit data or larger) with large keys (128-bit or greater). This practice makes brute force attack (attempting every possible combination) upon the encrypted data difficult and impractical. Modern encryption systems further employ multiple rounds (or iterations) of encryption to add further complexity and reduce recognizable patterns in the data.

The encryption systems utilizing DES and AES are well known and have been well scrutinized, evaluated, and tested. These encryption systems represent a departure from the historical norm where the details of the encryption system were closely guarded. The philosophy of these public encryption systems is to make the details public in order to strengthen the algorithms (as a result of scrutiny and evaluation of the encryption community) and keep the large key (which is relatively immune to brute force attack) secure. Ultimately, the security of these systems resides in the use of large and secure keys.

One issue that is not addressed in public encryption systems such as DES and AES is the problem of covert research and attacks. Often referred to as "Hackers" and the activities as "Hacker attacks", there is an element of society that has demonstrated a desire to scrutinize, evaluate, and test security systems without the intention of sharing their results for the purpose of constructive contribution. These people (and others) have demonstrated a desire to exploit weaknesses without sharing details of the weakness so that improved security systems can be developed.

The present exclusive encryption system addresses this limitation of public encryption systems by providing a system and method for employing a unique encryption algorithm while still using an encryption system that has been strengthened by public analysis and evaluation.

SUMMARY OF THE INVENTION

It is, therefore, an object of the present invention to provide an encryption system including a plurality of encryption operations composed of individual encryption operations and group encryption operations available for application in the encryption of data. The plurality of encryption operations are selected from the group consisting of functional variance, functional alignment, mathematical offset, wide XOR function, short logical rotation, long logical rotation, functional order, and address encryption. The encryption system also includes at least one round of encryption composed of a first encryption operation and a second encryption operation. The first encryption operation is selected from the plurality of encryption operations acting upon input data to generate a first encrypted data set. The second encryption operation is selected from the plurality of encryption operations acting upon the first encrypted data set to generate a second encrypted data set. The first encryption operation and the second encryption operation are different.

It is also an object of the present invention to provide a system wherein the individual encryption operations include mathematical offset, wide XOR function, short logical rotation and long logical rotation, and the group encryption operations include functional variance, functional alignment, functional order and address encryption.

It is another object of the present invention to provide a system including a plurality of rounds of encryption composed of at least two encryption operations.

It is still another object of the present invention to provide a system including a field programmable gate array.

It is yet another object of the present invention to provide a system wherein the encryption operation of mathematical offset employs pseudo adders.

It is a further object of the present invention to provide a system wherein the encryption operation of wide XOR function employs greater than a 2-input XOR gate.

It is also an object of the present invention to provide a system wherein the wide XOR function includes an XOR gate having an input and a plurality of multiplexers having outputs which supply the inputs of the XOR gate.

It is another object of the present invention to provide a system wherein each multiplexer includes a first select line, and the first select line is connected to a circular buffer.

It is a further object of the present invention to provide a system wherein the encryption operation of short logical rotation includes a circular buffer.

It is yet a further object of the present invention to provide a system wherein the encryption operation of long logical rotation includes a circular buffer.

It is still a further object of the present invention to provide a method for encryption including selecting a plurality of individual encryption operations, selecting a plurality of group encryption operations and applying data to the individual and group encryption operations.

It is also an object of the present invention to provide a method wherein the individual encryption operations are selected from the group consisting of mathematical offset, wide XOR function, short logical rotation and long logical rotation.

It is another object of the present invention to provide a method wherein the group encryption operations are selected from the group consisting of functional variance, functional alignment, functional order and address encryption.

It is a further object of the present invention to provide a method wherein the individual encryption operations include mathematical offset, wide XOR function, short logical rotation and long logical rotation.

It is also an object of the present invention to provide a method wherein the group encryption operations include functional variance, functional alignment, functional order and address encryption.

It is still another object of the present invention to provide a method wherein the encryption operation of mathematical offset employs pseudo adders.

It is yet a further object of the present invention to provide a method wherein the encryption operation of wide XOR function employs greater than a 2-input XOR gate.

It is also an object of the present invention to provide a method wherein the wide XOR function includes an XOR gate having an input and a plurality of multiplexers having outputs which supply the inputs of the XOR gate.

It is another object of the present invention to provide a method wherein each multiplexer includes a first select line, and the first select line is connected to a circular buffer.

It is a further object of the present invention to provide a method wherein the encryption operation of short logical rotation includes a circular buffer.

It is also an object of the present invention to provide a method wherein the encryption operation of long logical rotation includes a circular buffer.

It is yet another object of the present invention to provide a method including the step of performing multiple rounds of encryption wherein each round of encryption includes selecting a plurality of individual encryption operations, selecting a plurality of group encryption operation, and applying data to the individual and group encryption operations.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 3 is a schematic of various adders in accordance with the present invention.

FIG. 4 is a schematic of adder elements combined into an n-bit adder.

FIG. 5 is a table showing 4-bit adder and pseudo adder example outputs.

FIG. 6 is a schematic showing a comparison of AES 2-input XOR with the wide XOR employed in accordance with the present exclusive encryption system.

FIG. 7 is a schematic of a wide XOR encryption operation in accordance with the present invention.

FIGS. 8 and 9 are schematics showing different implementations of multiplexer select lines being controlled by inputs from a circular buffer.

FIG. 10 is a schematic of cellular or local rotation encryption operation in accordance with the present invention.

FIG. 11 is a schematic of a block-wide or global rotation encryption operation in accordance with the present invention.

FIG. 12 shows an example of functional alignment in accordance with the present invention.

FIG. 13 is a table showing output data based upon functional dependencies.

FIG. 14 shows an example of variance in functional order in accordance with the present invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

In accordance with a preferred embodiment of the present invention, and with reference to the various figures, an exclusive encryption system for implementation using computer based processors is disclosed. The present exclusive encryption system provides a methodology and associated system for employing a unique encryption algorithm while still using techniques strengthened by analysis and evaluation.

Figure 1:
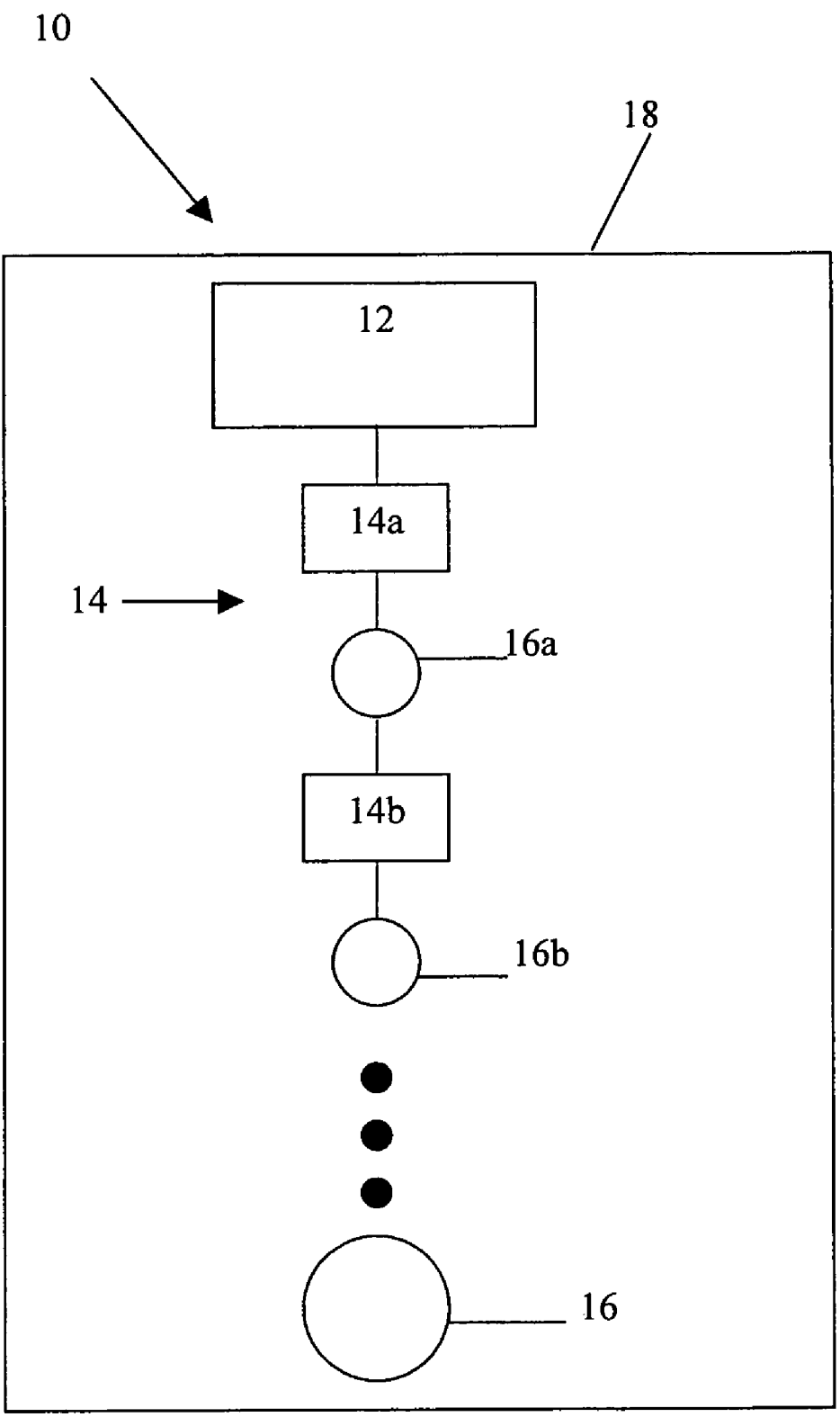
FIG. 1 is a schematic of the present exclusive encryption system.

Referring to FIG. 1, the exclusive encryption system 10 employs a plurality of encryption operations 14 composed of individual encryption operations and group encryption operations available for application in the encryption of data 12. The encryption operations, as well as the storage of data, is achieved using known processing systems 18 as discussed below in greater detail. The plurality of encryption operations are selected from the group consisting of functional variance, functional alignment, mathematical offset, wide XOR function, short logical rotation, long logical rotation, functional order, and address encryption. The exclusive encryption system 10 includes at least one round of encryption composed of a first encryption operation and a second encryption operation. The first encryption operation 14a is selected from the plurality of encryption operations 14 acting upon input data 12 to generate a first encrypted data set 16a and the second encryption operation 14b is selected from the plurality of encryption operations 14 acting upon the first encrypted data set 16a to generate a second encrypted data set 16b. The first encryption operation and the second encryption operation are different. Ultimately, and after a predetermined number of encryption operations are performed a final encrypted data 16 is provided for storage (for example, within a digital data storage medium) and subsequent decryption when needed.

The present exclusive encryption system is referred to as being "exclusive encryption" because each implementation is unique while maintaining the proven characteristics, techniques, and structure of a general encryption system. As will be appreciated based upon the following disclosure, an encryption designer may selectively implement the various encryption operations disclosed in accordance with the present invention to create a unique encryption system. As a result, individual computer systems may be provided with unique encryption systems custom tailored to the specific needs of the specific computer systems. These unique encryption systems may be implemented by either loading them on to the computer systems in which they are intended to function or through the implementation of a removable "encryption engine" that may be selectively added to the computer systems for encryption of the data (for example, via a remote device attached at a USB port of a computer system).

As those skilled in the art will certainly appreciate, not all USB devices are flash memory. In addition, not all flash memory cards are selectively attached at a USB port. This contemplated embodiment is intended to describe an encryption engine, in whatever form it takes, that may be attached to the computer system via a USB-type device. In fact, it is contemplated the USB device may not have any flash memory at all. In accordance with one embodiment, the encryption engine might be a USB hard drive plugged into the encryption device (which in this embodiment takes the form of the computer system) so that any data passing from the computer system to the USB hard drive is encrypted and data moving from the USB hard drive to the computer system is decrypted. As such, without the USB encryption engine, the data on the USB hard drive would be inaccessible.

The use of known encryption techniques and structure (algorithms) employed in accordance with the present exclusive encryption system provide proven security. The unique nature (exclusivity) of each implementation provides additional layers of security by limiting an adversary's knowledge of the cipher employed, adding orders of magnitude of possible combinations and ciphers, and providing protection for encryption devices even if one device is compromised (that is, if an adversary gains information on the cipher of one device, information about other devices is still unknown since all devices are exclusive of each other with unique parameters and functional details).

The present exclusive encryption system is capable of providing encryption well suited for programmable logic devices (PLD). Programmable logic devices provide benefits in encryption and anti-tamper systems that make an efficient PLD based encryption system attractive for many applications.

Examples of applications where the present exclusive encryption system is appropriate for use with PLD are as follows. First, implementing the encryption engine in a PLD instead of in software to run on a processor provides for many orders of magnitude improvement in throughput (conversion speed). The present exclusive encryption system implemented in PLDs operate on the order of gigabits per second because the entire data block (128-bit or wider) is processed at onetime in parallel. In a PLD an entire encryption round is performed in one clock cycle. In a processor, a single encryption round can require thousands of operations. So the present exclusive encryption system in PLD is attractive in many applications where the speed of data flow is critical, such as, digital video systems and memory storage (such as hard drives).

Second, the present exclusive encryption system can be implemented in an ASIC (Application Specific Integrated Circuit) and such an implementation would provide an increase in speed. However, it would be difficult to take advantage of the benefits of the present exclusive encryption system (that is each unit being unique) in an ASIC. The production cost of ASICs in high quantity is lower than the production cost of PLDs, but the cost of designing an ASIC is much higher. So a system where each device is unique is not cost effective in an ASIC. Additionally, the PLD allows the present exclusive encryption system to be altered after production for the purpose of upgrading or changing the encryption parameters for improved security. Because of the PLD modifiable characteristics, the present exclusive encryption system in PLD has applications in military systems and security systems due to the fact the uncompromised device may be upgraded or improved while the compromised device may be sanitized.

The present exclusive encryption system provides greater than 128-bit encryption protection and adds additional layers of encryption and security beyond that provided by existing encryption systems.

The present exclusive encryption system also allows every implementation to function as a unique encryption system (exclusive), while ultimately remaining similar although not identical and, therefore, not susceptible to decryption, in structure and technique. As a result, one unit (device) may be compromised (single-point compromise) but all other units remain secure. The similarity of the basic structure, that is, the building blocks of the present exclusive encryption system, allows the basic concepts of the present exclusive encryption system to be tested and exposed to industry wide scrutiny to ensure the encryption is thorough and secure. The present exclusive encryption system further provides improved encryption techniques by leveraging certain digital electronics techniques and lends itself well to high-speed implementation and very high data throughput.

Figure 2:
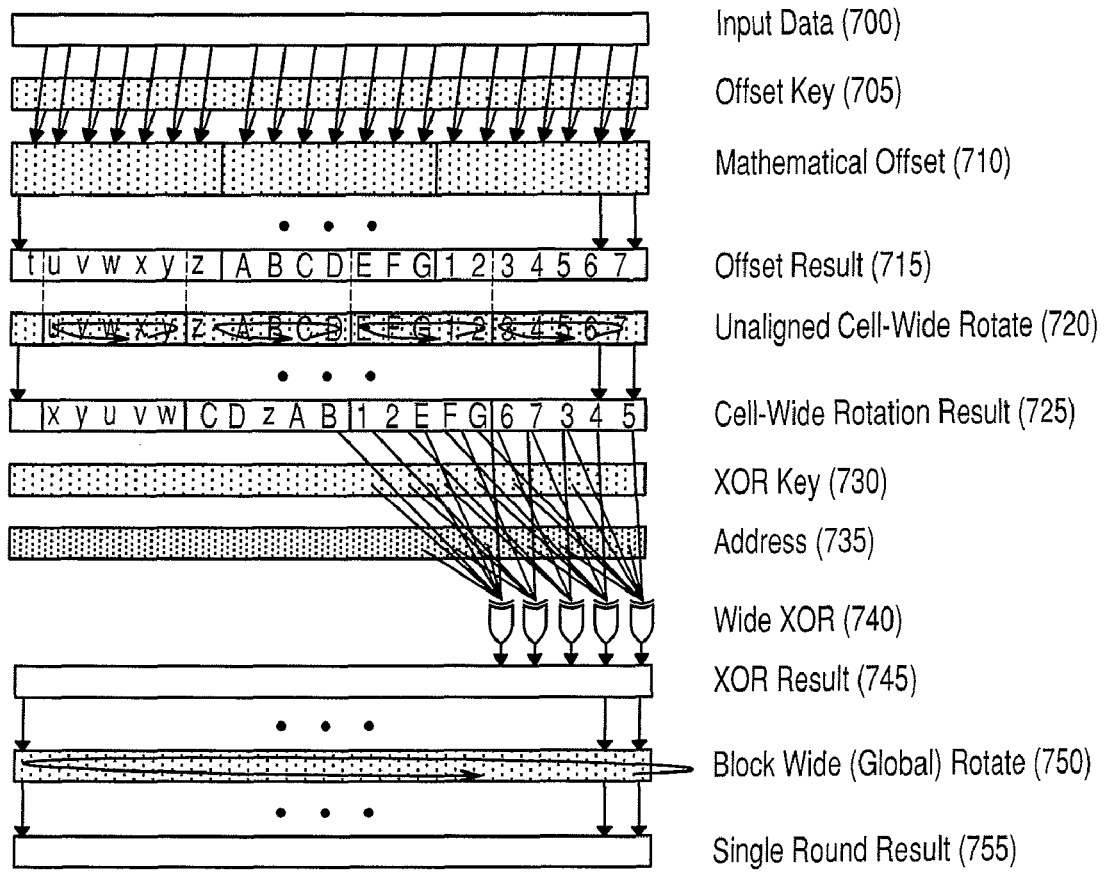
FIG. 2 is a diagram of an encryption round in accordance with the present invention.

Referring to an embodiment shown with reference to FIG. 2, the present exclusive encryption system employs individual and distinct encryption operations, or functions, combined to provide for enhanced functionality and security. In accordance with the embodiment shown with reference to FIG. 2, the input data is acted on by a mathematical offset encryption operation, a cell-wide rotate (or short logical rotation) encryption operation, a wide XOR encryption operation and a block wide rotate (or long logical rotation) encryption operation. In accordance with a preferred embodiment, a round of encryption includes a set of encryption operations applied to input data in a specific order. In accordance with a preferred embodiment of the present exclusive encryption system, the data is operated on by numerous rounds of encryption operations. As discussed below in greater detail, to enhance and ensure adequate security, each encryption operation is applied to the data with specific parameters and keys. The parameters and keys are modified (permuted). Some keys are permuted between each round of encryption, while some keys are permuted between each set of data. As will be appreciated based upon the following disclosure, these keys and parameters are stored and maintained for subsequent decryption of the data.

The present exclusive encryption system is a block cipher system. That is, and in accordance with a preferred embodiment of the present invention, the data is grouped in large blocks that are encrypted as a unit. Each output bit of the cipher text is in some way a function of every bit in the input block and every bit of the key. Because of this, the block cipher system utilized in accordance with the present invention provides for a powerful encryption tool.

In modern systems, 128-bit data blocks and 128-bit keys are typical. Even larger blocks are not unusual. In the present exclusive encryption system, a 128-bit data block can have a 512-bit key (or larger). In accordance with a preferred embodiment, the present exclusive encryption system is implemented with 128-bit data block and a 380-bit key.

As briefly discussed above, the encryption operations used in accordance with a preferred embodiment of the present invention are: functional variance and functional alignment, mathematical offset, wide XOR function, short logical rotation, long logical rotation, functional order, and address encryption. Considering these various encryption operations, they may be classified as individual encryption operations or group encryption operations. For example, mathematical offset, wide XOR, short logical rotation and long logical rotation are encryption operations directly acting upon the input data and are, therefore, considered individual encryption operations. In contrast, functional variance, functional alignment, function order and address encryption are concerned with how the various individual encryption operations are implemented and, therefore, are considered to be group encryption operations.

As briefly discussed above, an individual encryption operation employed in accordance with the present invention is mathematical offset (or MATH Offset). Mathematical offset employs a key value (that is, an offset key) that is added to (or logically combined with) the data to be encrypted. The addition is achieved by logical operators referred to as adders and pseudo adders in accordance with the present description. Examples of operations are disclosed with reference to FIG. 3. Details of these various operations are discussed below in greater detail.

The additions are piecewise, that is, 128-bit data block is divided into smaller n-bit sizes and n-bit additions are performed with carry bits ignored. For instance, a 128-bit data block can be divided into 16, 8-bit units, each added to an 8-bit portion of the 128-bit offset key.

In accordance with a preferred embodiment, 4-bit to 10-bit adders are used. Smaller adders have the benefit of completing the operation faster than larger, for example, a 128-bit, adders. The various bit widths of the adders are used to provide functional variance and differences in functional alignment as discussed below in greater detail. For instance, a conversion encryption operation employing mathematical offset made up of 7-bit and 6-bit adders may be used prior to an encryption operation made up of 5-bit rotates (as discussed below in greater detail) in such a manner that the sub-function boundaries do not align. Referring to FIG. 10, the lines between 1A, 2A and 3A are sub-function boundaries. The function is "Conversion Function 1" item 103. 1A is a sub-function of 103 and the separation between these sub-functions are what are referred to for the purpose of the present disclosure as "sub-function boundaries". Two encryption operations made up of adders may be used in series with appropriate sub-function alignment, for example, one encryption operation made up of 7-bit and 6-bit adders feeding into an encryption operation made up of 8-bit adders.

As briefly discussed above, it is further contemplated a pseudo mathematical offset may also be used. A pseudo mathematical offset is an encryption operation that operates like a mathematical encryption operation, but does produce an arithmetic sum. These functions may also be referred as pseudo adders for reasons which those skilled in the art will certainly appreciate.

Binary adders are described as being comprised of basic functional elements referred to as a "full adder." A full adder can accept three inputs of the same magnitude. Two of these inputs are the bits of magnitude order x from the input operands ($A_x$ and $B_x$) and the third is the carry in ($C_{in}$) from the previous (x−1) addition operation. In the case of full adders, two functions are at work, a SUM function and a CARRY function. FIG. 3 shows a normal full adder element (200) with SUM (202) and CARRY (204) functions and pseudo adders (210 and 220) with SUM (212 and 222) and pseudo-CARRY (214 and 224). As shown in FIG. 3, the SUM function (202) of any of the full adder, pseudo adder A or pseudo adder B is the "exclusive OR" (XOR) of all inputs, $A_x$, $B_x$, and $C_{in}$, into the adder, that is:

SUM=$A_x$ XOR $B_x$ XOR $C_{in}$.

The CARRY (204) of the full adder is a majority function of the same inputs employing a collection of AND gates feeding into an OR gate:

CARRY=$A_x$ AND $B_x$ OR $A_x$ AND $C_{in}$ OR $B_x$ AND $C_{in}$.

In the pseudo adders illustrated in FIG. 3, only the CARRY function has been changed (to what we call a pseudo CARRY). For example, in pseudo adder A the CARRY (214) is a function of the same inputs feeding into an OR gate:

CARRY=A OR B OR C.

In the pseudo adder B the carry (224) is a function of the same inputs feeding into an AND gate:

CARRY=A AND B AND C.

In accordance with a preferred embodiment of the present invention, it is contemplated pseudo adders may also be designed that use alternative Sum functions. It should be understood, the examples employed in the present disclosure for the purpose of describing a preferred embodiment of the present invention use the True Sum function, that is the exclusive or (XOR) of the three inputs (A, B and carry in). This True Sum function is combined with novel functions for the Carry Output. The True Carry function (and the True Sum function) is shown in FIG. 3 as the top square (200). In the other examples in FIG. 3, Alternative Functions are used for the Carry output but the True Sum function remains unchanged. Combining an Alternative Carry function with the True Sum function produces what is referred to in accordance with the present disclosure as a pseudo adder. A pseudo adder can also be produced by combining n Alternative Sum function with the True Carry function, or by combining an Alternative Sum function with an Alternative Carry function.

Three alternative sum functions that work well in accordance with implementation of mathematical offset in the present exclusive encryption system are 1) the inverse of the sum (the exclusive NOR, or XNOR, of the three inputs), which yields the inverse result which is trivial but provides a valid one-to-one mapping, 2) the inverse sum plus 1, and 3) the XOR or inputs A and B only (ignoring the Carry input as far as the SUM is concerned). A Pseudo Sum and a Pseudo Carry both require a little care to ensure that the output is valid, that is that one-to-one mapping is produced that can be reversed for decrypting. Alternative Carry Functions may be combined with the True Sum Function, or Alternative Sum Functions may be combined with True Carry Functions, or Alternative Sum Functions may be combined with Alternative Carry Functions. This last case should be approached carefully to ensure that the process (algorithm) results in a valid function.

As one well versed in the art of binary arithmetic will certainly appreciate, full adders are combined to form an n-bit adder (240) as depicted in FIG. 4. An operand A (242) is an n-bit binary number with individual bit $A_0$ to $A_{n-1}$. Similarly, operand B (244) is an n-bit binary number with individual bits $B_0$ to $B_{n-1}$. A plurality of n-bit full adders (250) is combined to form the n-bit adder (240). Each full adder (250) is configured with the corresponding bits from operand A and B as inputs along with the CARRY output ($C_{out}$) of the previous full adder. In the case of the least significant (or first) adder, the carry input ($C_{in0}$) is set to zero in order to produce an appropriate arithmetic sum. The least significant carry input ($C_{in0}$) may be set to one or zero as an option when using the n-bit adder as a component of an encryption system, thereby providing more functional variance.

Similarly, pseudo-adder cells (such as those depicted in FIG. 3, and other pseudo adder cell implementations) can be combined to form n-bit pseudo-adders.

The purpose of the mathematical offset encryption operation is to convert an n-bit input into an n-bit term that is a function of the input and a key. As such, and in accordance with a preferred embodiment of the present exclusive encryption system, the last CARRY output is ignored. When using an adder (whether it be a full adder or a pseudo adder in accordance with the present invention) for part of the encryption algorithm, one operand serves as the key and the other is the input plain text (that is, the data input). The output (without the additional carry bit) is the partial cipher text. It is important to ensure that the process may be reversed so the plain text can be recovered knowing the cipher text (that is, the encrypted data) and the offset key. The carry output is not required for either the enciphering or the deciphering process.

In the same manner that the full adder elements are combined to form an n-bit adder, the pseudo adder elements can be combined to form an n-bit pseudo adder. Where pseudo adders are employed, the pseudo adder elements must be designed so that all possible combinations on an n-bit plain input produce a unique output. That is, for operand A equal to a constant, there are $2^n$ possible values for operand B (from zero to $2^n-1$). Every possible input of operand B must produce a unique Sum value. This is also referred to as a one-to-one correspondence between the input and the output.

FIG. 5 illustrates a table showing the operation of effective adder functions for a 4-bit example mathematical offset encryption operation. The pseudo A column is the result of a pseudo adder with logical OR used as the CARRY function (such as 210 in FIG. 3). The pseudo B column is the result of a pseudo adder with logical AND used as the CARRY function (such as 220 in FIG. 3). The pseudo C column is the result of a pseudo adder with CARRY=($A_x$ AND $B_x$) OR $C_{in}$. As with the full adder operation described above, one operand serves as the offset key and one operand is the input.

For a constant offset key (7 or 1 in the example shown with reference to FIG. 5) and all possible inputs, each possible output occurs once and only once. This is another way of describing the one-to-one relationship between the input value and the output value. If this condition is not met, decryption is not possible and the cipher algorithm is useless.

With the offset key set to 7, column "pseudo C" produces the same result as the true full adder. When the offset key is set to 1, however, none of the pseudo adders produce the same result as the true full adder. The capability of the pseudo adder to sometimes mimic the true full adder (aliasing) is important in confusing an adversary, such as a cryptanalyst attempting to reverse engineer the present exclusive encryption system. The Table presented in FIG. 5 also demonstrates that each of the encryption operations selected exhibits one-to-one characteristics and are reversible.

The mathematical offset encryption operation is not strictly arithmetic addition or truly an offset, but rather a randomizing function that generates a unique output for each input. The adder and pseudo adder functions generate a unique set of results for each partial input. By partial we mean the plain text input is divided into small pieces to be operated on separately (as discussed in the functional variance and functional alignment paragraphs) and each encryption operation is part of a number of operations that take place during each of multiple rounds of encryption. Because of the fractal nature of the process, each mathematical offset operation contributes to a greater complex function that is the result of all the various encryption operations and encryption operational parameters employed during an encryption round in accordance with the present exclusive encryption system.

It is also important to note that in the mathematical offset encryption operation, a bit is the function of other bits of equal or lesser magnitude. Bits of greater magnitude do not contribute to the value of the result bit. It is important that each bit be the result of multiple input and key bits. It is also interesting from which bits the output results.

A mathematical offset encryption operation may be built in reverse order so the data dependency flows in the opposite direction (lesser order bits become the result of higher order bits). This technique, referred to in the context of the present invention as a reverse adder, is useful in providing options for the variability of the exclusive encryption system. The mathematical offset function of each round may then be composed of adders, pseudo-adders, reverse adders, and reverse pseudo adders or any combination of these devices.

As discussed below in greater detail, the XOR function processes the data in such a way that the resultant bits are a function of bits of equal or higher order. Developing the encryption operations in this way allows for good diffusion by using one process to create dependencies from one direction (lower order) and another process to create dependencies from another direction (higher order). These processes may be reversed, as stated, for better variation.

Referring to FIG. 6, a wide XOR function is another encryption operation which is used in the implementation of the present invention. In accordance with the principles of wide XOR function, each bit of the input data is exclusively ORed with other input bits, keys bits, and other data. As with other encryption operations, the manner in which the data is XORed is important for ensuring subsequent decryption.

In accordance with a preferred embodiment, seven-input exclusive-ORs (XOR) are used. As those skilled in the art will certainly appreciate, any number of input XORs will work, but a couple of observations are important in considering the application of wide XOR function to the present exclusive encryption system.

First, in existing encryption systems (such as AES and DES) only 2-input XORs are used; one bit of the input data is XORed with one bit of the key. This produces relatively little encoding each round. A goal of the present exclusive encryption system is to increase the amount of encoding, variance, and dependency of one bit upon multiple other bits. As a result, some value greater than 2-bit XOR is desired. With this in mind, wide XOR is meant to refer to an operation employing an XOR that employs greater than a 2-input XOR gate.

As mentioned above, another goal of the present exclusive encryption system is efficient operation thereof when implemented in programmable logic devices.

Field programmable gate arrays (FPGA) hold great potential for use in encryption systems. Because of this, the logical structure of the FPGA is used as a standard of the design in accordance with a preferred embodiment of the present exclusive encryption system and for the purpose of describing a preferred embodiment in accordance with the present invention. FPGAs use 4-input look-up-tables for logic realization. Because of this, a 4-input XOR is as efficiently implemented in a FPGA as a 2-input XOR. Additionally, a 7-input XOR can be implemented in a FPGA in 2 look-up-tables. In accordance with a preferred embodiment of the present encryption system, 7-input XORs were used. Wider input XORs produce much better encryption.

The width of the XOR has a compounding effect of the throughput rate and on the resource requirements. The fastest throughput is achieved using an XOR that is 4-inputs wide or less. This requires one logic element per bit of output. Logic elements are the basic building block of the FPGA. The 4-input XOR requires one logic element per bit (of the data block). For 128-bit encryption, this equates to 128 logic elements. If a 5-7 input XOR is used, the system is delayed by one additional logic element delay and 256 logic elements are needed. A logic element is required for every 3 additional inputs to the XOR and an additional delay is incurred. Somewhere along the way a point is reached where increased encryption become too expensive in time and resources. 130-bit XORs, for example, would require 43 logic elements for each bit or 5,504 logic elements for the wide XOR function only. Also, the delay created by using 43 logic elements is the difference between 250 Mb/second throughput and a throughput on the order of 1 Mb/second. The reason for the huge difference in throughput is that the encryption system is composed of numerous rounds of encryption, so the delay is also compounded. In accordance with one implementation, using a 128-bit data block and 7-bit wide XORs required a little over 1,000 logic elements to implement the entire encryption system. The 5,504 logic element requirement is for the XORs only. 100,000 logic element FPGAs are available. An 8,000 logic element FPGA costs about $20-$30. In addition, one should not forget that whatever resources are used for encryption, one will also require a similar amount for decryption (usually more for decryption than encryption).

As a result, it is contemplated one can implement the present exclusive encryption system with as wide an XOR as is desired, but you will pay the price in encryption delay and resource cost. It is contemplated a 13-input XOR is reasonable and a 22-input XOR is very achievable with reasonable throughput.

The wide XOR function XORs the nth bit of the input data with the nth bit of the key and with other bits of data, key, address, or other parameters. The bits other than the nth bit, are selected by multiplexers so that each round of encryption in the process is different. Because of the variability of which other bits (other than the nth input data and nth key bits) can be selected, this wide XOR function offers a nearly infinite number of options in structure (see FIGS. 6 and 7).

FIG. 7 illustrates one possible implementation of the wide XOR function in accordance with the present invention. A seven-input XOR gate (400) produces the zeroth output term, $F_0$ (402). The inputs of the XOR gate (400) are the zeroth data bit, $D_0$ (404) and the respective outputs (410, 412, 414, 416, 418, and 420) of six multiplexers (430, 432, 434, 436, 438, and 440) are connected to and supply the inputs of the XOR gate (400). The select inputs of the multiplexers are not shown in this illustration for the sake of clarity although those skilled in the art would certainly appreciate the implementation thereof in accordance with the present invention. As illustrated, the encryption function that produces each specific output bit is varied by the multiplexers. If the select lines of each pair of multiplexers are connected, such that multiplexer 430 and 432 are coupled, similarly the select lines of 434 and 436 as well as the select lines of 438 and 440, the resulting encryption operation is the same as the encryption operation illustrated in FIG. 7.

The data block (450) represents the data to be input into the wide XOR encryption operation in this specific round of encryption. This may be plain text data coming into the present exclusive encryption system, or output data from another encryption operation or round of encryption. The key block (460) represents a unique key input into the present exclusive encryption system for the express purpose of serving as an XOR key against the input data. The address block (470) may be the address that specifies where the data resides in memory, the order of the data in a file, or an additional encryption parameter. The significance of the use of the address block will become more obvious when address encryption is discussed below in greater detail.

It is contemplated multiplexers of any width can be employed. However, it also is contemplated the use of wider multiplexers provides for better and more secure encryption. Four-to-one multiplexers (as illustrated) were used in accordance with a preferred embodiment. Programmable logic devices provide a practical (and easily implemented) method for construction a wide XOR function with multiplexers as wide as desired. Wider multiplexers, however, produce a similar penalty in resource requirements and throughput speed as wide XOR gates.

The encryption operation that controls the multiplexer select lines may be varied for each round of encryption under the control of the FPGA. Additionally, each of the multiplexer select functions may be independent, paired as described above, or all select functions from all six multiplexers may be connected into a single function. The select inputs for a multiplexer are referred to as a select sub-function since it is a subset of the entire multiplexer select function. The multiplexer control function may, therefore, be many times larger than the data block size.

FIG. 7 shows a 7-input XOR gate with 6 multiplexers. The multiplexers determine which bits get XORed with the reference data bit (DO in this case). Specifically, the select lines for each multiplexer determine which bits are selected for operation. (The specific multiplexers shown in FIG. 7 require two select lines each, referred to as S0 and S1 respectively as discussed below and shown with reference to FIGS. 8 and 9).

In accordance with a preferred embodiment, and with reference to FIG. 8, the select lines S0, S1 of various multiplexers 800, 802, 804, 806 are connected to a circular buffer 810, that is, an n-bit register that has a rotate function performed on its data bits. In accordance with a preferred embodiment of the present invention, a 16-bit circular buffer works well with a 16-round encryption because it provides a bit for each round of encryption, then the process starts over for the next block of data (this is easy to decipher since it is known where the system starts and stops on each data block). In accordance with the implementation shown with reference to FIG. 8, the arrangement of the output 820 of the circular buffer 810 used to create the multiplexer selects is uniform and regular. Each select line S0 is offset 8-bits away from each select line S1 and the select lines S0, S1 of each subsequent multiplexer 800, 802, 804, 806 is offset 2-bits from the previous multiplexer 800, 802, 804, 806. Although the use of the circular buffers described herein is employed in conjunction with a wide XOR encryption function, multiplexers 800, 802, 804, 806 such as those disclosed herein and that are controlled by this circular buffer 810 can be utilized to implement a local rotate function or a global rotate function, or to rout the inputs to the wide XOR encryption function. It is further understood that each multiplexer in the illustration may represent a set of multiplexers distributed across the data block, all driven by the same select values.

Referring now to FIG. 9, an alternate implementation is disclosed wherein a 16-bit circular buffer 810 controls multiplexers 800, 802, 804, 806 with an irregular arrangement of select lines S0, S1. FIG. 9 illustrates the same 16-bit circular buffer 810 and multiplexers 800, 802, 804, 806 as in FIG. 8, but the outputs 820 of the circular buffer 810 used to drive the multiplexers 800, 802, 804, 806 are arranged in an irregular fashion. The large number of possible connections of the select lines S0, S1 provide some of the variation between each implementation of the present exclusive encryption system.

It may be shown that the 16-bit circular buffer 810 as described herein with reference to a preferred embodiment of the present invention provides 240 valid and unique connection patterns for multiplexers with 2 select lines. If 4 sets of multiplexers are to be controlled by the circular buffer, there are 240 to the fourth power (over 3 billion) unique control systems possible. If the system is composed of 8 sets of multiplexers the possible control combinations are 240 to the eighth power (on the order of 11,000,000,000,000,000,000 combinations). If 8-input multiplexers are used (3 select lines for each multiplexer) there are 3,360 unique and valid connections possibilities for each multiplexer's select lines.

A preferred embodiment utilizes 6 4-input multiplexers per XOR gate as illustrated in FIG. 7. In the case of this preferred embodiment, there are 240 to the sixth power (on the order of 191 trillion) of possible combinations available for connection of the select lines to the circular buffer.

The select lines S0, S1 of the multiplexers can be connected to the circular buffer in a number of ways. All of S0 lines can be connected to bit 0 of the circular buffer and all of the S1 lines can be connected to bit 1. Or the connection may be spaced so that all S0 are connected to bit 0 and all S1 are connected to bit 8. This system works nicely because if all multiplexers have select="00" each multiplexer provides a different bit input to the XOR (as illustrated in FIG. 7). For each value of select line pairs a similar result occurs in that the inputs are further spaced (to the left from the reference data bit, D0) but all are unique. The select lines can connect to separate bits of the circular buffer, however, so that each multiplexer receives its own select values. Specifically, and with reference to FIG. 7, multiplexer 430 select lines can be connected to bits 0 and 1 (of the circular buffer as discussed above with reference to FIGS. 8 and 9), multiplexer 432 select lines can be connected to bits 4 and 5, multiplexer 434 select lines can be connected to bits 8 and 9 and so on.

Similarly, the multiplexer or select lines for each wide XOR can be selected differently from select lines or other wide XOR groups (one group for each bit of the data block, FIG. 7 illustrates one wide XOR group). In accordance with a preferred implementation of the present invention, 2 sixteen-bit circular buffers were used. One circular buffer provided the data for S0 and one provided the data for S1. Four sets of drive signals were generated for the S0 and S1 bits. In each wide XOR group, all S0 and S1 were driven identically, but each wide XOR group received its select signals from one of the 4 possible pairs. In this way, for 128-bit encryption this implementation has 32 select line sets coming from pair A, 32 select line sets from pair B, 32 from pair C, and 32 from pair D. The arrangement of the groups driven by each pair provides more parameters for variation. For example, 16 pairs of select signals (or any other value could just as easily be generated), or different circular buffers, circular buffers of different sizes could be used, or a mathematical function could be used to produce the select values instead of circular buffer (it can be shown that a circular buffer can produce any sequence of sixteen values for the select lines that a designer may desire).

As those skilled in the art will certainly appreciate, the number of select lines of multiplexers is a function of the number of multiplexer inputs. For example, a multiplexer with two select lines, as described in accordance with a preferred embodiment, would be a four input multiplexer. It is, however, contemplated two, four or eight input multiplexers may be utilized in accordance with preferred embodiments of the present invention.

As a result, the present invention allows for the production of values for the select lines of the multiplexer from a number of different sources and grouping of the select lines, both inside the XOR group and among other XOR groups.

The availability of such a large encryption parameter provides an opportunity to construct numerous encryption devices of similar structure, but functionally different due to the differences of the wide XOR multiplexer select function. The multiplexer select function may be varied in a variety of different manners.

For example, it is contemplated the structure may vary as to how the multiplexers are constructed (two-to-one, four-to-one, eight-to-one, etc) and connected to the data, key, and address data. For instance the multiplexer input signal may be spaced every other data bit, or every third, etc, or the input of individual multiplexers may be completely independent, or identical, or shared (as illustrated in FIG. 7). In addition, the form may be varied as to how individual multiplexer select functions are connected and related; that is, whether the select sub-functions are independent, the same, paired (as described above) or some other combination). The actual data used in the multiplexer select function may also be varied. In addition, the value relationship describes how the select sub-function data is derived from the complete set of multiplexer select function control data. That is, for every set of select sub-functions, the manner in which individual bits of the multiplexer select function are assigned is controlled in accordance with the present invention. Discrete bits may be assigned to the select sub-functions or bits may be shared among various select sub-functions. Bits may be assigned contiguously to each sub-function or the bits may be interleaved among various sub-functions. Basically, there are a great many methods of assigning the select data to each sub-function. Permutation may also be varied, that is, how the data value (that is, the actual data used in the multiplexer select function) is changed between each round of encryption and between each block that is encrypted.

The function that controls the multiplexers is described as an encryption parameter rather that a key. In accordance with a preferred embodiment of the present invention, an encryption parameter is included into the present exclusive encryption system as part of the design. The encryption parameters are used to determine how the various encryption operations operate. A key, by contrast, is input into the operating encryption operation by the user or administrator. Once the present exclusive encryption system has been implemented, the encryption parameters are set, but the keys may be changed.

Another encryption operation that is employed in accordance with the present invention is short logical rotation (cellular or cell-wide rotation, also local rotation as shown with reference to FIG. 10). In accordance with the short logical rotation, the data block is divided into a number of functional units (cells) and the data within each cell is rotated. The bit-width of the cells may be all the same, or individual cells may be of varying widths. Each cell rotates a discrete number of bits based on a rotation parameter. The rotation parameters are permuted between each round so the bits are rotated differently each round.

The short logical rotation function may be varied. In particular, the bit width may be varied, that is, the size of each cell may be adjusted. Two bits to 32-bits makes sense for use in accordance with a preferred embodiment of the present exclusive encryption system. More particularly, it has been found that 3-bit to 7-bit rotation cells appear to be most effective for use in accordance with the present exclusive encryption system. A prototype embodiment of the present exclusive encryption system used 4-bit rotation cells. An exclusive encryption system using cells of different widths (4, 5, and 6-bit) has also been implemented in accordance with preferred embodiments of the present invention.

The rotation range, that is, how many bits the cells may rotate, may also be varied. The exclusive encryption system in accordance with a preferred embodiment of the present invention uses 4-bit cells with a rotation of 1, 2, or 3 bits each round; therefore, the rotation range of those cells is 1 to 3. It should be noted that in a 4-bit system a rotation of 0 bits is the same as a rotation of 4 bits.

Rotation grouping may also be varied. As such, the rotation cells may be set as groups that rotate the same number of bits each round. The number of bits that each group rotates is set independently from the other groups. Obviously, there may be as many rotation groups as there are cells (in which case all are independent) or one or any number in between.

In accordance with a preferred embodiment of the present exclusive encryption system, four groups were used with each group containing 8 cells. The cells of each group were evenly dispersed.

Rotation grouping options may also include how the cells in each group are distributed throughout the data block. An even and regular distribution was employed in accordance with a preferred embodiment of the present invention, but there are advantages in using an irregular distribution of cells within each rotation group.

How the rotation distance is changed from round to round, that is, rotation variance, may also be employed in accordance with the present invention. As with the wide XOR, circular buffers are used to produce the select lines that indicated how much to rotate the data during each round of encryption (for both local and global rotation). In accordance with a preferred embodiment, a circular buffer is used to determine the rotation distance in the same manner that a circular buffer is used to control the multiplexers that feed the wide XOR function as illustrated in FIGS. 8 and 9. The circular buffer contains data that indicates how many bits of rotation are to be applied to each round of encryption. For decryption, the circular buffer increments in reverse order. Each rotation group can have its own circular buffer, or each group can use data from a different location within the same buffer.

In accordance with an original implementation of the present invention, 8 sixteen-bit circular buffers (this becomes an additional 128-bit key) were used. The local rotation cells were divided into 8 groups, each group receiving its rotation distance value from its specific circular buffer. The rotation cells were preferably arranged so that every $8^{th}$ unit had the same rotation distance. It is contemplated one could just have easily used a random distribution of the rotation values or used more or less groups of unique rotation values.

The size of the buffers can also be different. The specific bits of the buffer used as the rotation information may also be varied. For example, and in accordance with a preferred embodiment of the present invention, each circular buffer is used to produce only 2-bits of rotation data. However, and in accordance with another version, of the present invention, each circular buffer was designed to output multiple data pairs to drive different rotation cells in order to provide more variation.

The data in the circular buffers may be hard-coded as a design parameter or may be input as part of the key or may be derived from the key data.

Referring to FIG. 11, long logical rotation (block or block-wide rotation, also global rotation) is a further encryption operation that may be utilized in accordance with the present invention. This encryption operation shifts all the bits of the data block. Long logical rotation helps ensure the mixing of the data bits across the entire data block. This encryption operation may be implemented with multiplexers of varying width or with shift registers. Because of the variety of methods known to those skilled in the art that can be used to implement long logical rotation encryption operation in accordance with the spirit of the present invention, the block-wide long logical rotation can be optimized for speed or resource utilization. In accordance with a preferred embodiment, four-to-one multiplexers are used to optimize the implementation for speed.

As with other encryption operations described herein, the long logical rotation encryption operation is variable by range and variance. As a result, the long logical rotation encryption operation is variable with regard to the number of bits of rotation. Range refers to the maximum shift, and variance refers to the number of different shift values available. For example, the present exclusive encryption systems can be designed to rotate 1 to 4 bits per round (Range-4, Variance-4), 1 to 8 bits per round (Range-8, Variance-8), 7 to 10 bits per round (Range-10, Variance-4), 0 to 128 bits per round (Range-127, Variance-128), or any other combination.

It is also contemplated the present exclusive encryption system can be designed with any number of variance up to the entire block size. The use of a large variance provides little encryption improvement over a well-planned variance in systems with a large number of encryption rounds. The number of rounds actually provides improvement to the overall encryption by applying this and other functions in multiple iterations. Using a Range of 10 and Variance of 4 (7 to 10 bits of rotation) provides as secure an encryption as any other combination requiring a minimum of resources and time.

The long logical rotation encryption operation can also be varied by spacing and regularity, that is, how the bits of rotation are spaced. In the section on range and variance as discussed below in greater detail, all of the examples use rotation distances that were regularly and closely spaced (that is, spacing 0). The long logical rotation encryption operation may use rotations of 7, 9, 11, and 13 bits for a range of 13 and a variance of 4 but the spacing provides for more options in the rotation without requiring more logic resources. This is a regularly arranged set of rotation options with a spacing of 1.

Irregular spacing creates long logical rotation encryption operation with rotation distances such as 1, 3, 7, 11 bits of rotation. This global function still requires the same resources to implement (four-to-one multiplexers) but provides much greater overall variation in the data result.

Long logical rotation is also varied by rotation permutation, that is, how the rotation distance is varied from round to round. In accordance with a preferred embodiment of the present invention, and as similarly discussed above with reference to the wide XOR function and short logical rotation, a circular buffer is used (similar to the circular buffers user for local rotation). A circular buffer with 16 data entries allows a 16 round encryption process to utilize a random pattern of global shifts. Decryption is then accomplished by using the same data in a circular buffer that outputs data in the opposite order.

A data buffer for controlling the long logical rotation encryption operation may be any factor of the total number of rounds (in which case the pattern would repeat) or a multiple of the number of rounds (which would allow subsequent data blocks to have different rotation patterns). Mathematical functions and sequencers can also be used to control the rotation permutation.

Numerous variations of the present exclusive encryption system can be implemented with the same shift register structure. The data in the shift register becomes one of the encryption parameters that differentiates each exclusive encryption system unit.

A primary feature of the present exclusive encryption system is that each of the individual encryption operations can be varied and have built-in variability in both structure and function. Functional variance and functional alignment provide for this goal.

Functional alignment is a subset of functional variance. Each series of encryption operations within an encryption round may be designed to align or misalign with preceding and following encryption operations in order to provide maximum diffusion.

More particularly, and referring to FIG. 12, three example conversion encryption operations (103, 107, and 111) are shown within a single encryption round. These are referred to as conversion encryption operations because the encryption operations convert the plain text data (that is, information that has not been encrypted) that is input into an encoded value. The resulting encrypted information is referred to as the "cipher text". Each conversion encryption operation is divided into sub-functions.

For the present exclusive encryption system, an n-bit adder is a sub-function of the mathematical offset encryption function. That is, for a 128-bit block operation, the 128-bit Mathematical Offset is composed of a number of n-bit adders (or pseudo adders) each of which may be referred to as a sub-function of the mathematical offset. For the wide XOR encryption function, each XOR gate with related multiplexers is a sub-function of the complete wide XOR encryption function. Similarly, for local (or cellular or short logical) rotation encryption function, each m-bit rotation cell is a sub-function of the entire local rotation encryption function. The global (or long logical) rotation encryption function does not have sub-functions since the entire data block is acted upon as a single unit.

For instance, conversion encryption operation 1 (103) is divided into sub-functions 1A through 1F. A block of input data (101) is applied to the first conversion encryption operation in parallel. A block of data, for the purpose of this application, is a v-bit wide set of parallel data. Typically, the data is presented contiguously, for instance, and in accordance with a preferred embodiment of the present invention, 128-bit block is made up of 16 sequential bytes of data arranged LSb (Least Significant bit) of one byte next to the MSb (Most Significant bit) of its neighboring byte, depending on endian format.

The v-bit input data (101) is applied to conversion encryption operation 1 (103) which is made up of six w-bit sub-functions. The resulting intermediate data (105) is applied to conversion encryption operation 2 (107) which is composed of seven sub-functions some of size x-bit and some of size y-bit. Alignment reference lines (121) are to aid in visualizing the misalignment of the sub-functions of conversion encryption operation 1 and conversion encryption operation 2.

The resulting intermediate data (109) from conversion encryption operation 2 is applied to conversion encryption operation 3 (111). Conversion encryption operation 3 is made up of 5 z-bit wide sub-functions. Alignment reference lines (123) are to aid in visualizing the misalignment of the sub-functions of conversion encryption operation 1, conversion encryption operation 2, and conversion encryption operation 3.

The resulting output data (113) from this single partial round of encryption has been operated on by a mixture of sub-functions. The 15 sub-data groups in the output (131 through 145) are unique in that each sub-group is the result of a different combination of sub-functions. This relationship helps to diffuse the encryption pattern. The data is further diffused by a shifting encryption operation that will cause these bits to be aligned to different sub-functions in the following rounds of encryption. FIG. 13 presents a table showing which sub-functions operated on each resulting sub-data group.

In accordance with examples present along the number of sub-functions each conversion encryption operation is divided into is strictly controlled. Ultimately, the application of functional variance and functional alignment in accordance with the present invention, wherein (1) each conversion encryption operation can be divided into a different number of sub-functions,
(2) the sub-functions may be of differing bit-width between the Conversion encryption operations and within a single Conversion encryption operation, and
(3) differing the bit-width and alignment of the sub-functions, changes the present exclusive encryption system and changes the diffusion of the present exclusive encryption system.

Another encryption operation that is employed in accordance with a preferred embodiment of the present invention is functional order. Functional order is applied where the encryption result are dependent on the order of the encryption operations. Two systems with identical encryption operations, parameters, keys, number of rounds, and data will produce different results if the encryption operations within each encryption round are presented in a different order.

FIG. 14 illustrates three different structures of encryption rounds (600, 620, 640). Each round includes a set of data registers (602, 622, 642) with sufficient capacity to store the entire data block. Data is input into the registers either as input data (612, 632, 652) or as partially processed data from the last encryption operation of the round (614, 643, 654). The registers (602, 622, 642) hold the data in a valid condition for input into the encryption operations. Each of the encryption operations (604, 606, 608, 610, 624, 626, 628, 630, 644, 646, 648, 650) are implemented with combinational logic in accordance with a preferred embodiment of the present invention so that the output of the processing round appears at the output of the last encryption operation in each round at the end of sufficient combinational propagation delay. In each of the examples, the output of the last encryption operation (616, 636, 656) may be output as a completed block of encrypted data or fed back into the register by feedback routing (614, 634, 654) for additional rounds of encryption processing.

In each of these encryption rounds (600, 620, 640) the encryption operations are identical (that is the MATH Offset function 604 is identical to MATH Offset function 624 and MATH Offset function 646) but in different order. For this example, encryption round 600 is the baseline structure with register 602 feeding data into MATH Offset function 604, which feeds global rotate function 606, which in turn feeds wide-XOR function 608, which feeds local rotate function 610 local rotate function 610 then provides data for feedback (614) to the registers (602) or output (616).

Encryption round 620 is constructed with the local rotate function (626) swapped in position with the global rotate function (630). Encryption round 640 is constructed with the math offset function (646) swapped in position with the global rotate function (644) as compared to encryption round 600. These three encryption round structures result in unique outputs even when all other parameters and variables are equal. The encryption operation of functional order, therefore, becomes another variable for producing the present exclusive encryption system.

A final encryption technique employed in accordance with a preferred embodiment of the present exclusive encryption system is address (or order) encryption. Address encryption scrambles the address of every byte or word. By doing this, the location of each data element is concealed and the encrypted data block is dispersed throughout memory. This technique provides an important additional layer of security for block ciphers.

In block ciphers, the entire block must be present in the correct order before any part of the block can be deciphered. For instance, a 128-bit cipher system encrypts 16 bytes of data simultaneously. If one byte is missing or incorrect, the block will be improperly decoded. Similarly, if all 16 bytes are known, but the order is incorrect, the data will be improperly decoded.

In accordance with a preferred embodiment of the present invention, mathematical offset, global shift, and wide XOR were used. Each byte address was encrypted separately.

When data is stored in memory, address encryption is simple to implement. For data stored as files, the process used is actually order scrambling. In order scrambling, a file of 1,000 bytes is treated as a 1,000 address memory element so that the bytes are appropriately disordered. For small files, this additional layer of security may seem trivial but is actually quite powerful. This technique is even more effective for large files since the larger data set gives more room for uncertainty in the order of the bytes. Many data files reach into megabytes of size providing sufficient statistical uncertainty.

With address, or order, encryption, there is no need for decryption. That is, each time an address is to be accessed (either for a read or a write), the system encrypts the address and reads or writes the encrypted location.

As a result of the combination of the encryption operations and techniques described above, an exclusive encryption system is provided that performs multiple rounds of encryption with multiple encryption operations. FIG. 2 illustrates one possible example of an exclusive encryption system in accordance with a preferred embodiment of the present invention. In this example exclusive encryption system, the input data (700) and an offset key (705) are first operated on by a mathematical offset function (710). The mathematical offset sub-function (710) has some bit-width different from the cell-wide (local) rotation sub-function (720) that follows so the result bits from each mathematical offset sub-function are mixed with output from other mathematical offset sub-functions within each of the rotation cells.

The result of the mathematical offset (715) is exposed to a cell-wide (local) rotation function (720). The result of the cell-wide rotation (725) is combined with an XOR key (730) and address data (or other function, 735) by a wide XOR function (740). The wide XOR function (740) accepts inputs across the boundaries of the cell-wide rotation function (725) to force the outputs to become the result of more inputs (wider input function). Finally, the result of the wide XOR (745) is processed by a block-wide (global) rotate function (750). The output of the global rotate is also the output of this round of encryption (755). Because of logic optimization, the various partial results (715, 725, 745, and 755) may not actually exist as discrete values internal to the programmable logic or ASIC in which the exclusive encryption system is implemented, but are shown here for clarity.

As the preceding disclosure shows, the present exclusive encryption system provides for multiple layers of encryption allowing a designer to uniquely tailor the encryption of data for enhanced protection and security. Since the present exclusive encryption system provides for unique encryption applications, the manner in which the encrypted data is decrypted is very important. As such, decryption will be achieved through highly specific methodology designed to ensure the encryption process is exactly reversed in the return of the original data.

For example, and in accordance with a preferred embodiment of the present invention, the encryption and decryption will occur on the same computer system. As such, the specific keys and parameters used during encryption will be stored on the system for use during the decryption process. Such a methodology would be implemented by providing the user with a password, or other security mechanism, to ensure that an authorized individual is decrypting the previous encrypted data.

In accordance with alternate embodiments, it is contemplated the encryption/decryption information may be stored on USB device that is selectively attached to the computer system when encryption or decryption is desired. The USB device would, therefore, function as an "encryption engine" capable of encrypting data to the hard drive of the computer system and then permitting removal of the encryption engine until such a time further encryption is required or one wishes to decrypt the stored information.

Where it is desired that the cipher text be transferred between locations, it is also contemplated that the decryption information could be forwarded with the cipher text. This could be achieved using a security database which an authorized user would access for retrieving the decryption information.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. An encryption system comprising:
    a plurality of encryption operations composed of individual encryption operations and group encryption operations available for application in the encryption of data;
    at least one processor or circuitry to implement said plurality of encryption operations from the group consisting of functional variance, functional alignment, mathematical offset, wide XOR function, short logical rotation, long logical rotation, functional order, and address encryption;
    each of a plurality of rounds of encryption operations composed of a first encryption operation and a second encryption operation and wherein the functional order is applied where encryption results are different if the encryption operations within each encryption round are selected in different order;
    the processor or circuitry to implement the first encryption operation from said plurality of encryption operations acting upon input data to generate a first encrypted data set;
    the processor or circuitry to implement the second encryption operation from said plurality of encryption operations acting upon the first encrypted data set to generate a second encrypted data set;
    wherein the first encryption operation and the second encryption operation are different.

2. The system according to claim 1, wherein the individual encryption operations include mathematical offset, wide XOR function, short logical rotation and long logical rotation, and the group encryption operations include functional variance, functional alignment, functional order and address encryption.

3. The system according to claim 1, further including a plurality of rounds of encryption composed of at least two encryption operations.

4. The system according to claim 1, wherein the processor or circuitry is field programmable gate array.

5. The system according to claim 1, wherein the encryption operation of mathematical offset employs adders, pseudo adders, reverse adders and reverse pseudo adders in the encryption operation.

6. The system according to claim 1, wherein the encryption operation of wide XOR function employs greater than a 2-input XOR gate.

7. The system according to claim 6, wherein the wide XOR function includes an XOR gate having an input and a plurality of multiplexers having varied outputs which supply the inputs of the XOR gate.

8. The system according to claim 7, wherein each multiplexer includes a first select line, and the first select line is connected to a circular buffer.

9. The system according to claim 1, wherein the encryption operation of short logical rotation includes a circular buffer.

10. The system according to claim 1, wherein the encryption operation of long logical rotation includes a circular buffer.

11. A method for encryption, comprising the following steps:
configuring at least one processor or circuitry to perform the functions of:
providing a plurality of encryption operations composed of individual encryption operations and group encryption operations available for application in the encryption of data and providing each of a plurality of rounds of encryption composed of a first encryption operation and a second encryption operation;
implementing said plurality of encryption operations from the group consisting of functional variance, functional alignment, mathematical offset, wide XOR function, short logical rotation, long logical rotation, functional order, and address encryption and wherein the functional order is applied where encryption results are different if the encryption operations within each encryption round are selected in different order;
implementing the first encryption operation from said plurality of encryption operations acting upon input data to generate a first encrypted data set;
implementing the second encryption operation from said plurality of encryption operations acting upon the first encrypted data set to generate a second encrypted data set;
wherein the first encryption operation and the second encryption operation are different.

12. The method according to claim 11 wherein the individual encryption operations are selected from the group consisting of mathematical offset, wide XOR function, short logical rotation and long logical rotation.

13. The method according to claim 11, wherein the group encryption operations are selected from the group consisting of include functional variance, functional alignment, functional order and address encryption.

14. The method according to claim 11, wherein the individual encryption operations include mathematical offset, wide XOR function, short logical rotation and long logical rotation.

15. The method according to claim 14, wherein the group encryption operations include functional variance, functional alignment, functional order and address encryption.

16. The method according to claim 11, wherein the encryption operation of mathematical offset employs adders, pseudo adders, reverse adders and reverse pseudo adders in the encryption operation.

17. The method according to claim 11, wherein the encryption operation of wide XOR function employs greater than a 2-input XOR gate.

18. The method according to claim 17, wherein the wide XOR function includes an XOR gate having an input and a plurality of multiplexers having varied outputs which supply the inputs of the XOR gate.

19. The method according to claim 18, wherein each multiplexer includes a first select line, and the first select line is connected to a circular buffer.

20. The method according to claim 11, wherein the encryption operation of short logical rotation includes a circular buffer.

21. The method according to claim 11, wherein the encryption operation of long logical rotation includes a circular buffer.

22. The method according to claim 11, further including the step of performing multiple rounds of encryption wherein each round of encryption includes selecting a plurality of individual encryption operations, selecting a plurality of group encryption operations and applying data to the individual and group encryption operations.

* * * * *